(12) United States Patent
Lee et al.

(10) Patent No.: US 12,278,506 B2
(45) Date of Patent: Apr. 15, 2025

(54) WIRELESS MANAGEMENT SYSTEM AND METHOD

(71) Applicant: DELTA ELECTRONICS, INC., Taoyuan (TW)

(72) Inventors: Yu-Wei Lee, Taoyuan (TW); Chih-Kuan Yen, Taoyuan (TW); Chin-Ming Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 28 days.

(21) Appl. No.: 18/492,804

(22) Filed: Oct. 24, 2023

(65) Prior Publication Data
US 2024/0372413 A1 Nov. 7, 2024

(30) Foreign Application Priority Data
May 5, 2023 (CN) .......................... 202310497687.3

(51) Int. Cl.
*H02J 50/80* (2016.01)
*H04W 24/08* (2009.01)

(52) U.S. Cl.
CPC ............. *H02J 50/80* (2016.02); *H04W 24/08* (2013.01)

(58) Field of Classification Search
CPC ................................ H02J 50/80; H04W 24/08
USPC ........................................................ 307/104
See application file for complete search history.

(56) References Cited

U.S. PATENT DOCUMENTS

| | | | |
|---|---|---|---|
| 9,319,911 B2 * | 4/2016 | Gupta | ............... H04W 28/0284 |
| 9,350,176 B2 | 5/2016 | Kwon et al. | |
| 9,867,062 B1 * | 1/2018 | Bell | ..................... H04B 7/0617 |
| 9,965,009 B1 * | 5/2018 | Bell | ....................... G06F 1/1698 |
| 9,973,011 B2 | 5/2018 | Park et al. | |
| 9,991,741 B1 * | 6/2018 | Bell | ................... H02J 7/00034 |
| 10,170,917 B1 * | 1/2019 | Bell | ....................... H02J 50/40 |
| 11,223,072 B2 | 1/2022 | Hwang et al. | |

(Continued)

FOREIGN PATENT DOCUMENTS

| CN | 105122581 B | 7/2018 |
|---|---|---|
| CN | 106030964 B | 11/2018 |

(Continued)

OTHER PUBLICATIONS

Minkyu Lee et al., "Wireless Battery Management System", World Electric Vehicle Symposium and Exhibition (EVS27), Nov. 17-20, 2013.

(Continued)

*Primary Examiner* — Alfonso Perez Borroto
(74) *Attorney, Agent, or Firm* — CKC & Partners Co., LLC

(57) ABSTRACT

A wireless management system includes a controller and energy storage units. Each of the energy storage units includes an energy storage device and a node substrate. The wireless management system is configured to select a first node substrate from the node substrates based on a signal strength of each of first request signals to join a local network by the controller. The wireless management system is further configured to select a second node substrate from the node substrates based on the signal strength of each of second request signals to join the local network by the first node substrate. The wireless management system is further configured to assign a serial number corresponds to each of the energy storage units based on the local network by the controller.

20 Claims, 14 Drawing Sheets

(56) References Cited

U.S. PATENT DOCUMENTS

| | | |
|---|---|---|
| 11,489,366 B2 | 11/2022 | Kahlman et al. |
| 2013/0271072 A1 | 10/2013 | Lee et al. |
| 2017/0331287 A1* | 11/2017 | Kopp ..................... H02J 3/003 |
| 2020/0252866 A1* | 8/2020 | Edlund ................... H04W 4/80 |
| 2021/0083527 A1* | 3/2021 | Hanson .................. H02J 50/12 |
| 2021/0120558 A1* | 4/2021 | Maruhashi ............ H04W 72/56 |
| 2022/0007166 A1* | 1/2022 | Fan ....................... H04W 84/18 |
| 2022/0166243 A1 | 5/2022 | Chan et al. |
| 2022/0255146 A1 | 8/2022 | Sylvester et al. |
| 2022/0305927 A1 | 9/2022 | Haas et al. |

FOREIGN PATENT DOCUMENTS

| | | |
|---|---|---|
| CN | 112702089 A | 4/2021 |
| CN | 110235299 B | 5/2022 |
| TW | 201027880 A | 7/2010 |
| TW | 202145673 A | 12/2021 |

OTHER PUBLICATIONS

Greg Zimmer, "Wireless Battery Management Systems Highlight Industry's Drive for Higher Reliability", Engineering, Feb. 2017.

* cited by examiner

WIRELESS MANAGEMENT SYSTEM AND METHOD

CROSS-REFERENCE TO RELATED APPLICATION

This application claims priority to China Application Serial Number 202310497687.3, filed May 5, 2023, which is herein incorporated by reference in its entirety.

BACKGROUND

Field of Invention

The present disclosure relates to a wireless management system and method. More particularly, the present disclosure relates to a wireless management system and method used for managing energy storage units.

Description of Related Art

In order to measure the voltage, current, temperature and other data of the energy storage devices, the current battery management system (BMS) needs to pull many wires between the management device and the energy storage devices, so that the management device can directly measure the status of each of the energy storage devices.

However, since each of the energy storage devices needs to be equipped with a wire connecting to the management device. When the number of energy storage devices increases, the number of wires connected to the management device also increases. The energy storage devices may be dangerous (such as short circuits) due to the complicated connection wires, and the risk of wire-pulling operation also increases. In addition, complicated connection wires will increase the cost of the product, making it difficult to maintain the quality and reliability of the product. Therefore, the method for managing energy storage devices using wireless communication technology provides a new solution.

In the prior art, when wireless communication technology is used to manage energy storage devices, each of the energy storage devices is directly connected to the management device for data transmission generally. However, due to the lack of mechanisms to manage signal transmission and reception, problems such as signal interference and devices unrecognition may occur.

In view of this, how to provide a wireless management technology for managing energy storage units is the goal that the industry strives to work on.

SUMMARY

The disclosure provides a wireless management system comprising a controller and a plurality of energy storage units. The controller comprises a first wireless communication module, and the controller is configured to establish a local network. Each of the energy storage units comprises an energy storage device and a node substrate. The node substrate is electrically connected to the energy storage device, wherein a second wireless communication module and a third wireless communication module are set on opposite sides of the node substrate respectively. The wireless management system is configured to select a first node substrate from the node substrates to join the local network based on a signal strength of each of a plurality of first request signals corresponding to the first wireless communication module by the controller, wherein the first node substrate is communicatively connected to the first wireless communication module through the second wireless communication module of the first node substrate to join the local network. The wireless management system is further configured to select a second node substrate from the node substrates to join the local network based on the signal strength of each of a plurality of second request signals corresponding to the third wireless communication module of the first node substrate by the first node substrate, wherein the second node substrate is communicatively connected to the third wireless communication module of the first node substrate through the second wireless communication module of the second node substrate to join the local network. The wireless management system is further configured to assign a serial number corresponding to each of the energy storage units based on the local network by the controller.

The disclosure also provides a wireless management method. The wireless management method is adapted for use in a wireless management system, wherein the wireless management system comprises a controller and a plurality of energy storage units, the controller comprises a first wireless communication module and is configured to establish a local network, each of the energy storage units comprises an energy storage device and a node substrate, a second wireless communication module and a third wireless communication module are set on opposite sides of the node substrate respectively, and the wireless management method comprises the following steps: the controller selects a first node substrate from the node substrates to join the local network based on a signal strength of each of a plurality of first request signals corresponding to the first wireless communication module, wherein the first node substrate is communicatively connected to the first wireless communication module through the second wireless communication module of the first node substrate to join the local network; the first node substrate selects a second node substrate from the node substrates to join the local network based on the signal strength of each of a plurality of second request signals corresponding to the third wireless communication module of the first node substrate, wherein the second node substrate is communicatively connected to the third wireless communication module of the first node substrate through the second wireless communication module of the second node substrate to join the local network; and the controller assigns a serial number corresponding to each of the energy storage units based on the local network.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
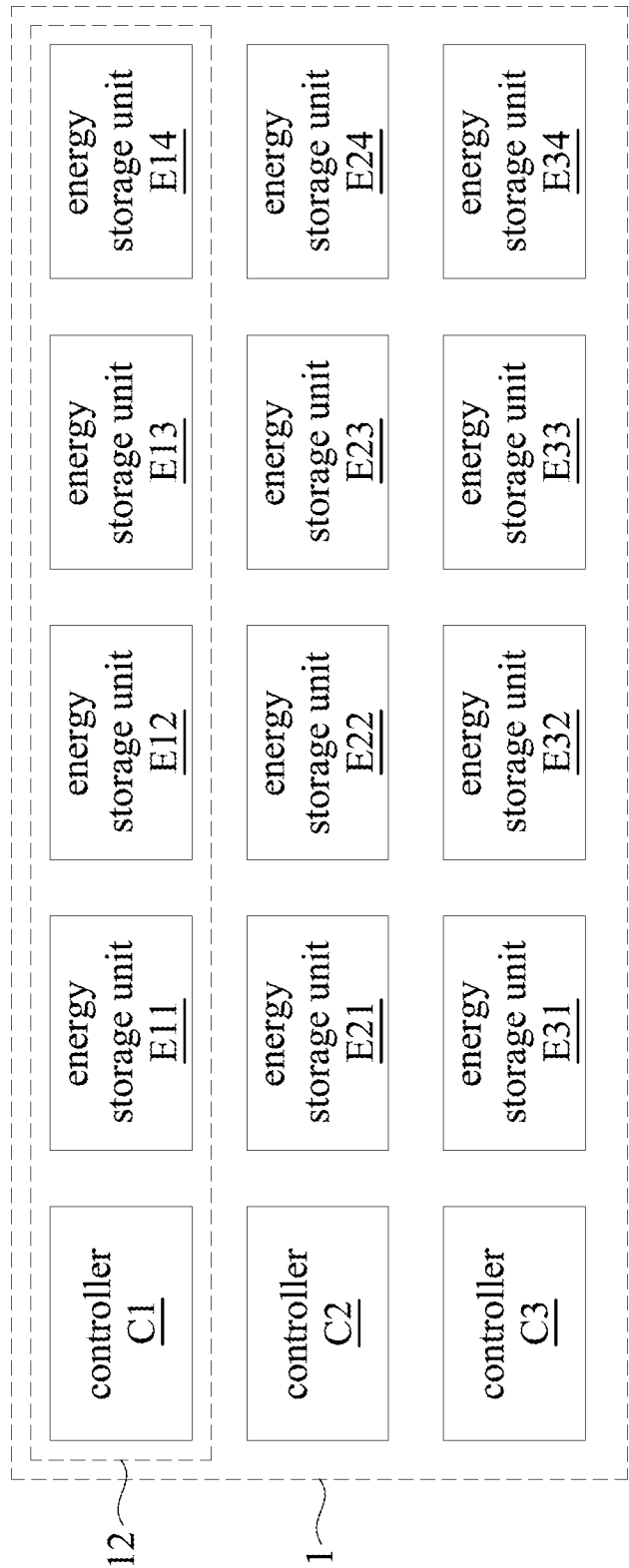
FIG. 1 is a schematic diagram illustrating an energy storage unit matrix according to the first embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating an energy storage unit matrix 1 according to the first embodiment of the present disclosure. In this example, the energy storage unit matrix 1 comprises controllers C1, C2, and C3 and energy storage units E11-E34.

It is noted that, the energy storage unit matrix 1 can be wirelessly managed by a plurality of wireless management systems through a local network of each of the wireless management systems. Ideally, a wireless management system manages a plurality of energy storage units in a local network through the local network by a controller wirelessly. For example, as shown in FIG. 1, the controller C1 and the energy storage units E11-E14 can establish a local network to perform wireless management (hereinafter referred to as wireless management system 12). In some embodiments, other local network can be established by another controller to perform wireless management. For example, the controller C2 and the energy storage units E21-E24 can establish another local network to perform wireless management, and the controller C3 and the energy storage units E31-E34 can establish another local network to perform wireless management.

It is noticed that, the number of the wireless management systems and the number of the energy storage units of the wireless management systems in the energy storage unit matrix 1 provided in the present disclosure is are only for clarity of illustration. In other embodiments, the energy storage unit matrix 1 can comprise any quantity of wireless management systems, and each of the wireless management systems can comprise any quantity of energy storage units.

For ease of illustration, the wireless management system 12 formed by the controller C1 and the energy storage units E11-E14 is taken as an example to illustrate the operations of the energy storage unit matrix 1 managing the energy storage units. As for the controllers C2 and C3 and the energy storage units E21-E24 and E31-E34 can also perform the same operation to achieve the same function. In some embodiments, the energy storage unit matrix 1 performs wireless signal transmission between the controllers C1, C2, and C3 and the energy storage units E11-E14, E21-E24, and E31-E34 by using radio frequency (RF) technology.

Figure 2:
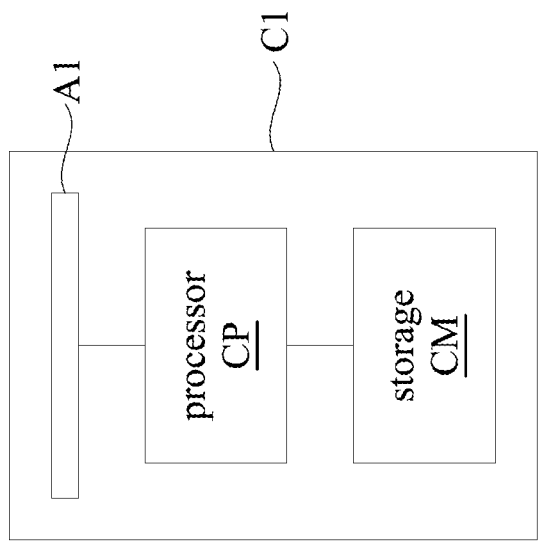
FIG. 2 is a schematic diagram illustrating a controller according to the first embodiment of the present disclosure.

Related to the controller C1, reference is made to FIG. 2. FIG. 2 is a schematic diagram illustrating the controller C1 according to the first embodiment of the present disclosure. A wireless communication module A1 is set in the controller C1. The controller C1 is configured to establish a local network and manage the energy storage units E11-E14. The wireless communication module A1 is configured to transmit and receive signals wirelessly and establish the local network to manage and recognize energy storage units. In some embodiments, the wireless communication module A1 can comprises a radio frequency transceiver and/or other wireless communication interface.

Figure 3:
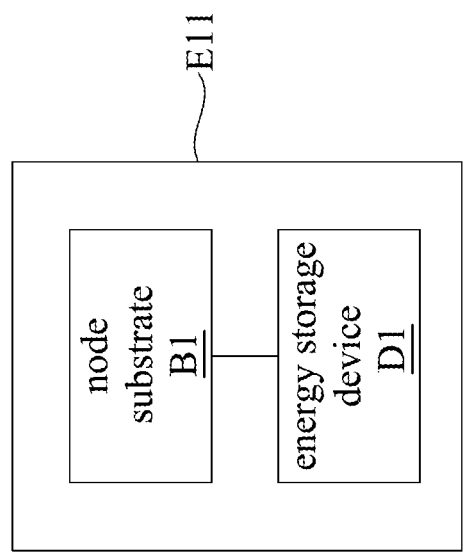
FIG. 3 is a schematic diagram illustrating an energy storage unit according to the first embodiment of the present disclosure.

Related to the energy storage units E11-E14, in this embodiment, each of the energy storage units E11-E14 has the same structure, for ease of illustration, the energy storage unit E11 will be used as an example to describe the structures of the energy storage units E11-E14. Reference is made to FIG. 3. FIG. 3 is a schematic diagram illustrating the energy storage unit E11 according to the first embodiment of the present disclosure.

The energy storage unit E11 comprises a node substrate B1 and an energy storage device D1. In some embodiments, the energy storage device D1 comprises a lithium battery, a lead-acid battery, and/or other device for storing energy.

In some embodiments, the energy storage unit can correspond to a battery module, wherein the energy storage device of the energy storage unit can be form by a plurality of battery cell. In some embodiments, the energy storage unit can also be referred to as an energy storage system, wherein the energy storage system is formed by energy storage devices and node substrates and has the same structure and function of the energy storage unit E11 provided in the present disclosure.

Figure 4:
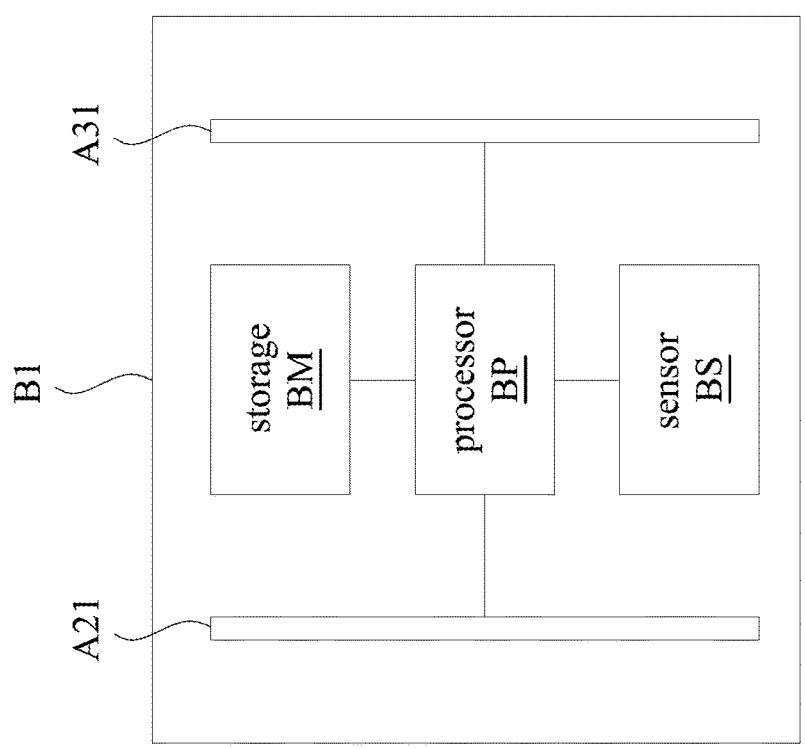
FIG. 4 is a schematic diagram illustrating a node substrate according to the first embodiment of the present disclosure.

Related to the node substrate B1, reference is made to FIG. 4. FIG. 4 is a schematic diagram illustrating the node substrate B1 according to the first embodiment of the present disclosure, wherein a second wireless communication module A21 and a third wireless communication module A31 are set on opposite sides of the node substrate B1 respectively. The second wireless communication module A21 and the third wireless communication module A31 are configured to receive and transmit signals wirelessly. In some embodiments, the second wireless communication module A21 and the third wireless communication module A31 can be wireless transceivers of the same specification. In some embodiments, each of the second wireless communication module A21 and the third wireless communication module A31 can comprise a radio frequency transceiver and/or other wireless communication interface.

It is noticed that, the wireless communication modules mentioned in the present disclosure can be understood as wireless communication apparatuses configured to transmit and/or receive wireless signals. In some embodiments, each of the wireless communication apparatuses can comprise a radio frequency transceiver and/or other wireless communication interface.

For ease of understand the operations of automatically forming the wireless management system, reference is made to FIGS. 5A, 5B, 6A, and 6B. FIGS. 5A, 5B, 6A, and 6B are schematic diagrams illustrating the operations of connections. In this example, a wireless network environment 20 comprises nodes B11, B12, and B13 (no local network formed yet).

It is illustrated that, in this example, the nodes B11, B12, and B13 can form a local network by using a mechanism of a coordinator and a subscriber. It is understood that the nodes in this example can be referred to as the wireless communication modules (e.g., the wireless communication modules A21 and A31) of the node substrate, and each of the wireless communication modules can be the coordinator or the subscriber in the local network. In other embodiments of the present disclosure, the wireless communication module of the controller (e.g., the wireless communication module A1) can also be the coordinator in the local network and execute the same operations. Specifically, when a node is a coordinator, the node can invite nodes which is a subscriber to join the local network by broadcasting an invitation signal to other nodes.

Figure 5B:
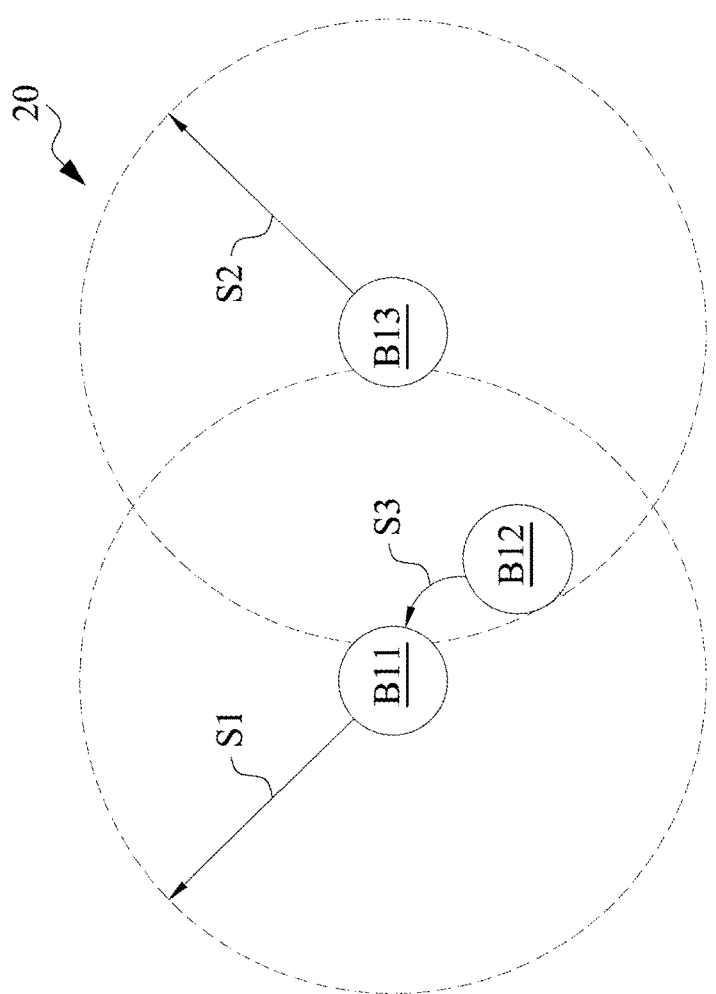
FIGS. 5A, 5B, 6A, and 6B are schematic diagrams illustrating operations of forming local networks according to the first embodiment of the present disclosure.
Figure 5A:
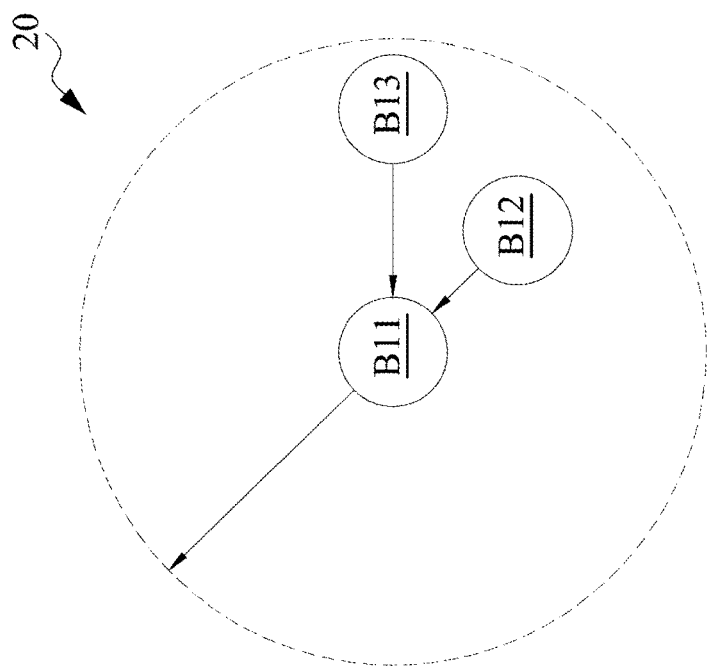

First, reference is made to FIG. 5A. In this example, the node B11 broadcasts the invitation signal as the coordinator in the local network. Next, after the nodes B12 and B13 receive the invitation signal from the node B11, the nodes B12 and B13 transmit a request signal to the node B11. After that, the node B11 selects the node B12 with the higher signal strength (e.g., closer distance) to join the local network. Details related to specific operations will be illustrated in the following paragraphs.

Next, reference is made to FIG. 5B, the nodes B11 and B13 broadcast invitation signals S1 and S2 respectively as the coordinators in the local network. After the node B12 receives the invitation signals S1 and S2 from the nodes B11 and B13, the node B12 selects the node B11 with the higher signal strength (e.g., closer distance) and transmits a request signal S3 to the node B11 to join the local network of the node B11.

Specifically, if the node B12 receives the invitation signal S1 from the node B11 and the invitation signal S2 from the node B13, the node B12 determines the signal strengths of the invitation signals S1 and S2 respectively and selects the node corresponding to the invitation signal with the highest signal strength (i.e., the invitation signal S1) to connect the node (e.g., the node B12 transmits the request signal S3 to the node B11 to join the local network of the node B11).

Figure 6B:
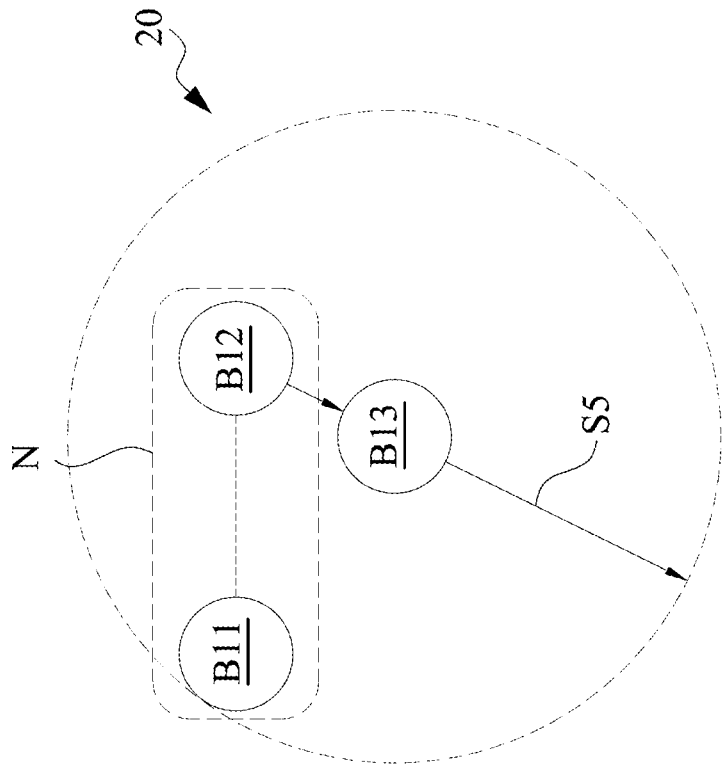
Figure 6A:
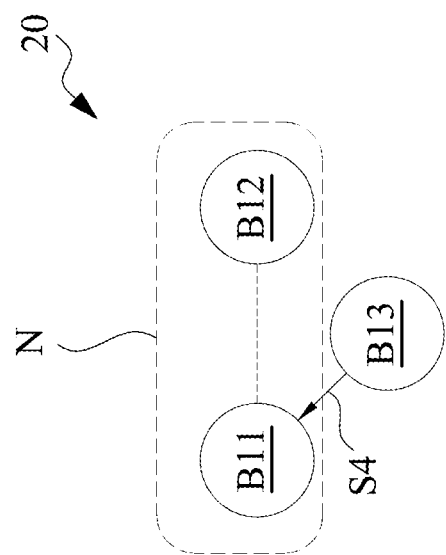

Furthermore, reference is made to FIG. 6A, a local network N comprises mutually and communicatively connected nodes B11 and B12, wherein the node B11 is the coordinator. In this example, the node B13 transmits the request signal to the node B11. When the node B11 determines that a condition (e.g., the signal strength is higher) is met by the request signal, the node B11 detaches the node B12 from the local network N, and the node B13 joins the local network instead.

Specifically, the node B11 receives a request signal S4 from the node B13, and the node B11 determines the signal strength of the request signal S4 (i.e., the signal strength corresponding to the wireless communication module of the node B11). Next, in response to the signal strength of the request signal S4 higher than a communication signal strength between the nodes B11 and B12 (e.g., the communication signal strength between the wireless communication module of the node B11 and the wireless communication module of the node B12), the node B11 selects the node B13 to join the local network N and disconnects the communicative connection between the nodes B11 and B12 to detach the node B12 from the local network N.

Finally, reference is made to FIG. 6B, the local network N comprises mutually and communicatively connected nodes B11 and B12. In this example, the node B12 receives an invitation signal S5 broadcasted by the node B13 and determines that a condition (e.g., the signal strength is higher) is met by the invitation signal broadcasted by the node B13, the node B12 disconnects from the local network N and joins the local network N' (not shown in FIG. 6B) of the node B13 instead.

Specifically, in response to the wireless communication module of the node B12 receiving the invitation signal S5 broadcasted by the wireless communication module of the node B13, the node B12 determines the signal strength of the invitation signal S5 (i.e., the signal strength corresponding to the wireless communication module of the node B12). Next, in response to the signal strength of the invitation signal S5 corresponding to the node B12 higher than a communication signal strength between the nodes B11 and B12 (e.g., the communication signal strength between the wireless communication module of the node B11 and the wireless communication module of the node B12), the node B12 disconnects the communicative connection between the nodes B11 and B12 (e.g., the communicative connection between the wireless communication module of the node B11 and the wireless communication module of the node B12) to be disconnected from the local network N and joins the local network N' of the node B13.

Through the operations mentioned above, the nodes B11, B12, and B13 in the wireless network environment 20 can select nodes to communicatively connect with and establish a local network based on the signal strengths of the signal between the nodes.

Figure 7:
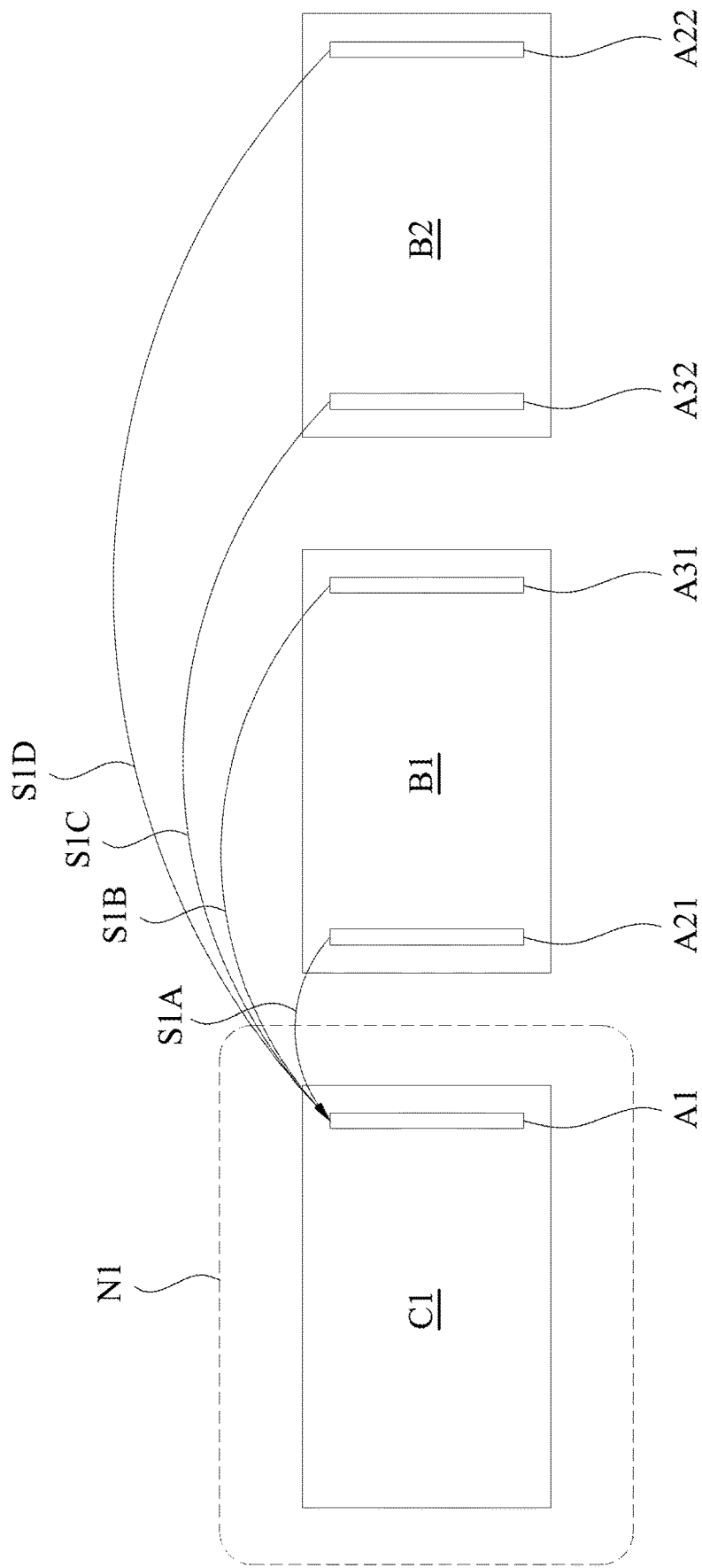
FIG. 7 is a schematic diagram illustrating a controller receiving request signals to select one of the node substrates to join a local network according to the first embodiment of the present disclosure.
Figure 8:
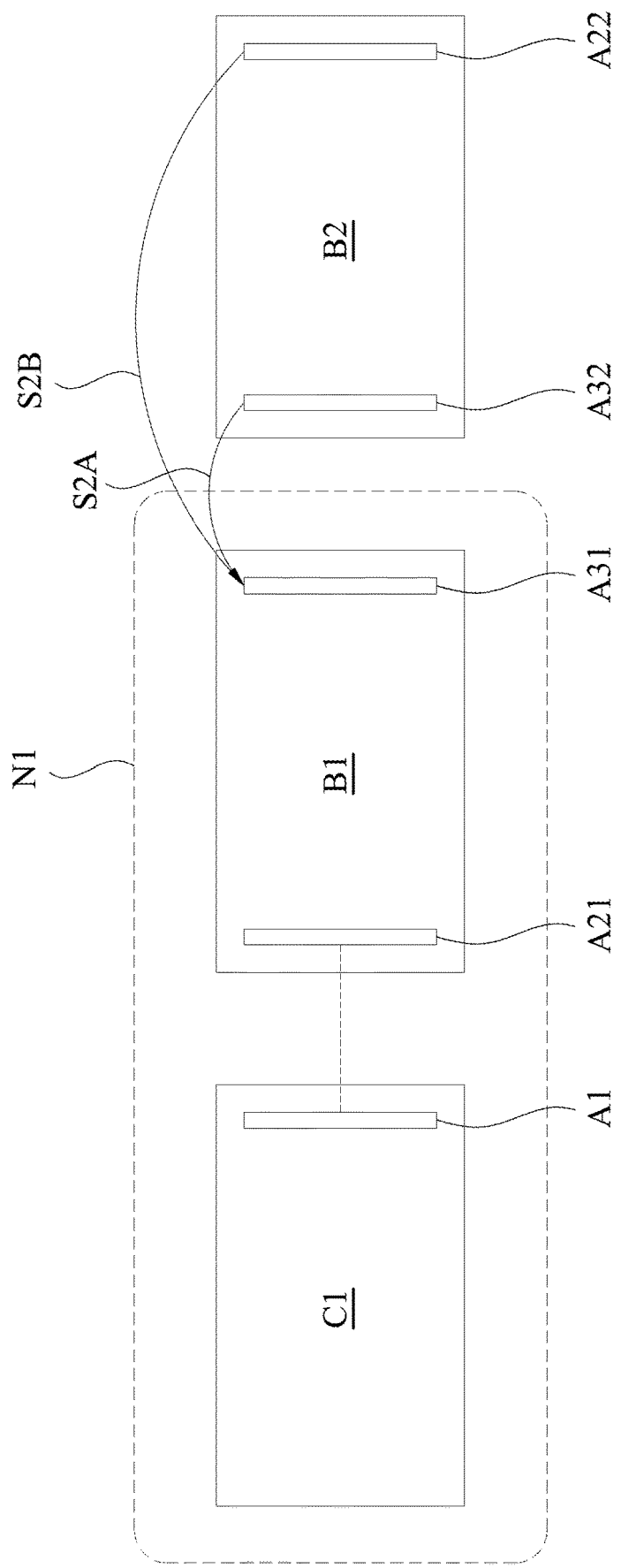
FIG. 8 is a schematic diagram illustrating a node substrate receiving request signals to select other node substrate to join the local network according to the first embodiment of the present disclosure.
Figure 9:
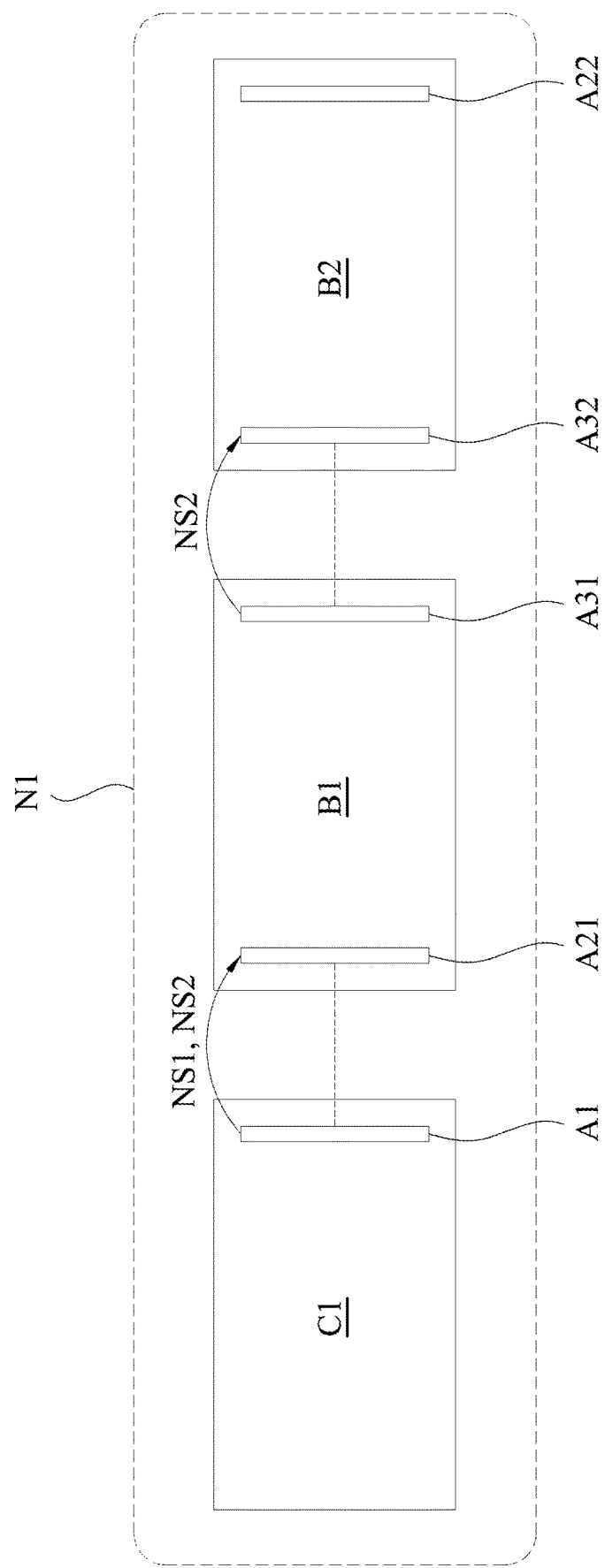
FIG. 9 is a schematic diagram illustrating communicative connections of the controller and the node substrates in the local network according to the first embodiment of the present disclosure.

Related to the operations of an energy storage unit matrix establishing a local network to manage energy storage units, reference is made to FIG. 7-9. FIG. 7-9 are schematic diagrams illustrating the wireless management system 12 establishing a local network N1 according to the first embodiment of the present disclosure.

First, the controller C1 selects the node substrate B1 or B2 to join the local network N1 based on signal strengths of each of request signals S1A, S1B, S1C, and S1D corresponding to the wireless communication module A1, wherein the wireless communication module A1 is set as a coordinator.

Specifically, as shown in FIG. 7, the wireless communication modules A21 and A31 of the node substrate B1 and the wireless communication modules A32 and A22 of the node substrate B2 transmit the request signals S1A, S1B, S1C, and S1D to the wireless communication module A1 of the controller C1 respectively. Furthermore, the controller C1 selects a node substrate (i.e., the node substrate B1 or B2) corresponding to a source (i.e., one of the wireless communication modules A21, A31, A32, and A22) of a request signal with the highest signal strength to join the local network N1 based on the request signals S1A, S1B, S1C, and S1D.

Since the wireless communication modules A21, A31, A32, and A22 has the same specification, the signal strength of each of the request signals S1A, S1B, S1C, and S1D corresponding to the wireless communication module A1 is related to the related distances between the wireless communication module A1 and the wireless communication modules A21, A31, A22, and A32 respectively. The closer the related distance, the higher the signal strength, on the contrary, the further the related distance, the lower the signal strength.

Accordingly, as shown in FIG. 7, the wireless communication module A21 is the closest to the wireless communication module A1 among the wireless communication modules A21, A31, A32, and A22. Thus, the request signal S1A has the highest signal strength corresponding to the wireless communication module A1 among the request signals S1A, S1B, S1C, and S1D. Furthermore, the controller C1 selects the node substrate B2 corresponding to the source of the request signal S1A (i.e., the wireless communication module A21) to join the local network N1, wherein since the communication signal strength between the wireless communication modules A21 and A1 is higher than the communication signal strength between the wireless communication modules A31 and A1, the node substrate B2 is communicatively connected to the wireless communication module A1 through the wireless communication module A21 to join the local network N1, and the wireless communication module A21 is a subscriber corresponding to the wireless communication module A1.

In some embodiments, before a second wireless communication module and/or a third wireless communication module of the node substrate join any local network, the wireless communication module is set as a subscriber. In response to receiving an invitation signal, the subscriber second wireless communication module and/or the subscriber third wireless communication module are configured to transmit a request signal to the source of the invitation signal. Therefore, the controller can broadcast an invitation signal by a first wireless communication module to make the second wireless communication module and/or the third wireless communication module respond the request signal after receiving the invitation signal, and then the controller selects the closest node substrate to join the local network N1 based on the signal strengths.

For example, the controller C1 can broadcast an invitation signal by the wireless communication module A1. After the wireless communication modules A21, A22, A31, and A32 of the node substrates B1 and B2 receive the invitation signal, the wireless communication modules A21, A31, A32, and A22 transmit the request signals S1A, S1B, S1C, and S1D to the wireless communication module A1. By the operations, the controller C1 can select the closest node substrate B1 to join the local network N1.

It is noticed that, for ease of illustration, FIG. 7 only takes the node substrates B1 and B2 as examples. In other embodiments, the invitation signal can be received by the second wireless communication module and/or the third wireless communication module of other number of the node substrates, and the second wireless communication module and/or the third wireless communication module transmit the corresponding request signal to join the local network established by the controller.

Next, reference is made to FIGS. 8 and 9. The node substrate B1 selects the node substrate B2 to join the local network N1 based on signal strengths of request signals S2A and S2B corresponding to the wireless communication module A31 of the node substrate B1.

Specifically, after the node substrate B1 joins the local network N1 through the wireless communication module A21, the node substrate B1 set the other wireless communication module (i.e., the wireless communication module A31) as a coordinator. Same as the operations of the wireless communication module A1 of the controller C1, the wireless communication module A31 receives the request signals S2A and S2B. Furthermore, the node substrate B1 selects a node substrate (i.e., the node substrate B2) corresponding to a source (i.e., one of the wireless communication modules A22 and A32) of a request signal with the highest signal strength to join the local network N1 based on the request signals S2A and S2B.

In this embodiment, the node substrate B1 selects the node substrate B2 corresponding to the source (i.e., the wireless communication module A32) of the request signal S2A with the highest signal strength to join the local network N1 by the same operations of the controller C1 mentioned above, wherein the wireless communication module A32 is a subscriber corresponding to the wireless communication module A31.

In some embodiments, after the node substrate B1 set the wireless communication module A31 as a coordinator, same as the operations of the wireless communication module A1 of the controller C1, the wireless communication module A31 broadcasts an invitation signal. After the wireless communication modules A32 and A22 of the node substrate B2 receive the invitation signal from the wireless communication module A31, the wireless communication modules A32 and A22 transmit the request signal S2A and S2B to the wireless communication module A31 respectively. By the operation mentioned above, the node substrate B1 can select the node substrate B2 corresponding to the wireless communication module A32 closest to the wireless communication module A31 to join the local network N1 based on the signal strengths. In other words, the node substrate B2 is communicatively connected to the wireless communication module A31 of the node substrate B1 through the wireless communication module A32 to join the local network N1.

In some embodiments, as shown in FIG. 9, after the node substrate B2 joins the local network N1 through the wireless communication module A32, the node substrate B2 can broadcast an invitation signal by the wireless communication module A22 to further invite other nodes to join the local network N1.

Based on the operations mentioned above, the controller C1 and the node substrates B1 and B2 can establish a daisy chain local network N1, wherein each of the first, second, and third wireless communication modules communicatively connect to the relatively closest wireless communication module and are able to transmit signals to other controllers and/or substrates through the relatively closest wireless communication module. Additionally, the node substrate B2 can also invite other node substrate to join the local network N1 based on the same operations.

It is noticed that, when the controller C1 and the node substrates B1 and B2 in the local network N1 transmit signals to other members (e.g., the controller C1 and the node substrates B1 and B2) in the local network N1 without communicatively connection, the controller C1 and the node substrates B1 and B2 need to transmit the signals through the adjacent member in the communicatively connecting relationships. For example, when the controller C1 transmits signals to the node substrate B2, the controller C1 needs to transmit the signals to the node substrate B1 first, and then the node substrate B1 transmits the signals to the node substrate B2, vice versa. For ease of illustration, the following paragraphs will not repeat the details about transmitting signals through other members.

Finally, the controller C1 assigns a serial number corresponding to each of the energy storage units (i.e., the energy storage units E11 and E12) corresponding to the node substrates B1 and B2 based on the local network N1.

Specifically, the controller C1 can assign serial numbers corresponding to the energy storage units (i.e., the energy storage units E11 and E12) corresponding to the node substrates B1 and B2 based on connection status records corresponding to the local network N1, wherein the connection status records correspond to the sequence of the energy storage units corresponding to the node substrates B1 and B2 joining the local network N1.

Reference is made to FIG. 9, first, the wireless communication module A1 of the controller C1 can transmit a serial number signal NS1 to the wireless communication module A21 of the node substrate B1 (i.e., the member communicatively connected to the wireless communication module A1 of the controller C1 in the local network N1), wherein the serial number signal NS1 comprises a serial number (e.g., 1) to be assigned.

Next, since the node substrate B1 has not been assigned a serial number after joining the local network N1, the corresponding energy storage unit E11 is in an unassigned state (e.g., the serial number column is NULL). Therefore, in response to receiving the serial number signal NS1 and the energy storage unit E11 corresponding to the node substrate B1 corresponding to the unassigned state, the node substrate B1 assigns a serial number (e.g., 1) to the energy storage unit E11 based on the serial number signal NS1. Since the energy storage unit E11 is assigned with a serial number, the energy storage unit E11 is switched to a numbered state.

In an embodiment, after the energy storage unit E11 is assigned with the serial number, the node substrate B1 transmits a confirm signal through the wireless communication module A21 to the wireless communication module A1 of the controller C1 to report an assigning result to the controller C1.

Next, the wireless communication module A1 of the controller C1 can further transmit a serial number signal NS2 to the wireless communication module A21 of the node substrate B1, wherein the serial number signal NS2 comprises a serial number (e.g., 2) to be assigned. Since the energy storage unit E11 is assigned with a serial number, in response to receiving the serial number signal NS2 and the energy storage unit E11 corresponding to the node substrate B1 corresponding to the numbered state, the wireless communication module A31 of the node substrate B1 transmits the serial number signal NS2 to the wireless communication module A32 of the node substrate B2 (i.e., the member communicatively connected to the wireless communication module A31 of the node substrate B1 in the local network N1). After the node substrate B2 receives the serial number signal NS2, the node substrate B2 can assign a serial number (e.g., 2) to the energy storage unit E12 based on the serial number signal NS2 by the same operations as the above-mentioned operations of the node substrate B1.

Based on the above-mentioned operations, the controller C1 can assign serial numbers to the energy storage units E11 and E12, thus, the controller C1, the node substrate B1, and/or B2 can recognize which member in the local network the signals are sent from and/or sent to. Also, when the local network N1 comprises different number of energy storage units, the controller C1 can also assign serial numbers to different number of energy storage units based on the above-mentioned operations assigning serial numbers. Namely, from the node substrate B1 communicatively connected to the controller C1, the controller C1 assigns serial numbers to the energy storage units sequentially based on the above-mentioned operations until all of the energy storage units in the local network N1 are numbered.

In other embodiments, the controller C1 can also transmit another serial number signal comprising all of the serial numbers to the node substrate B1 based on the number of node substrates in the local network N1. For example, the serial number signal comprises serial numbers 1 and 2. After the node substrate B1 or other node substrates receive the serial number signal, the node substrate B1 assigns the minimum serial number to the corresponding energy storage unit (i.e., the energy storage unit E11). Next, the node substrate B1 removes the assigned serial number from the serial number signal, and the node substrate B1 transmits the serial number signal to the next node substrate (i.e., the node substrate B2) in the local network N1. After the node substrate B2 receives the serial number signal, the node substrate B2 can assign the serial number 2 to the energy storage unit E12 by the same operations as the node substrate B1 to complete the number assignment in the local network N1. Identically, the operation can also be applied to local networks comprising other numbers of energy storage units.

Figure 10:
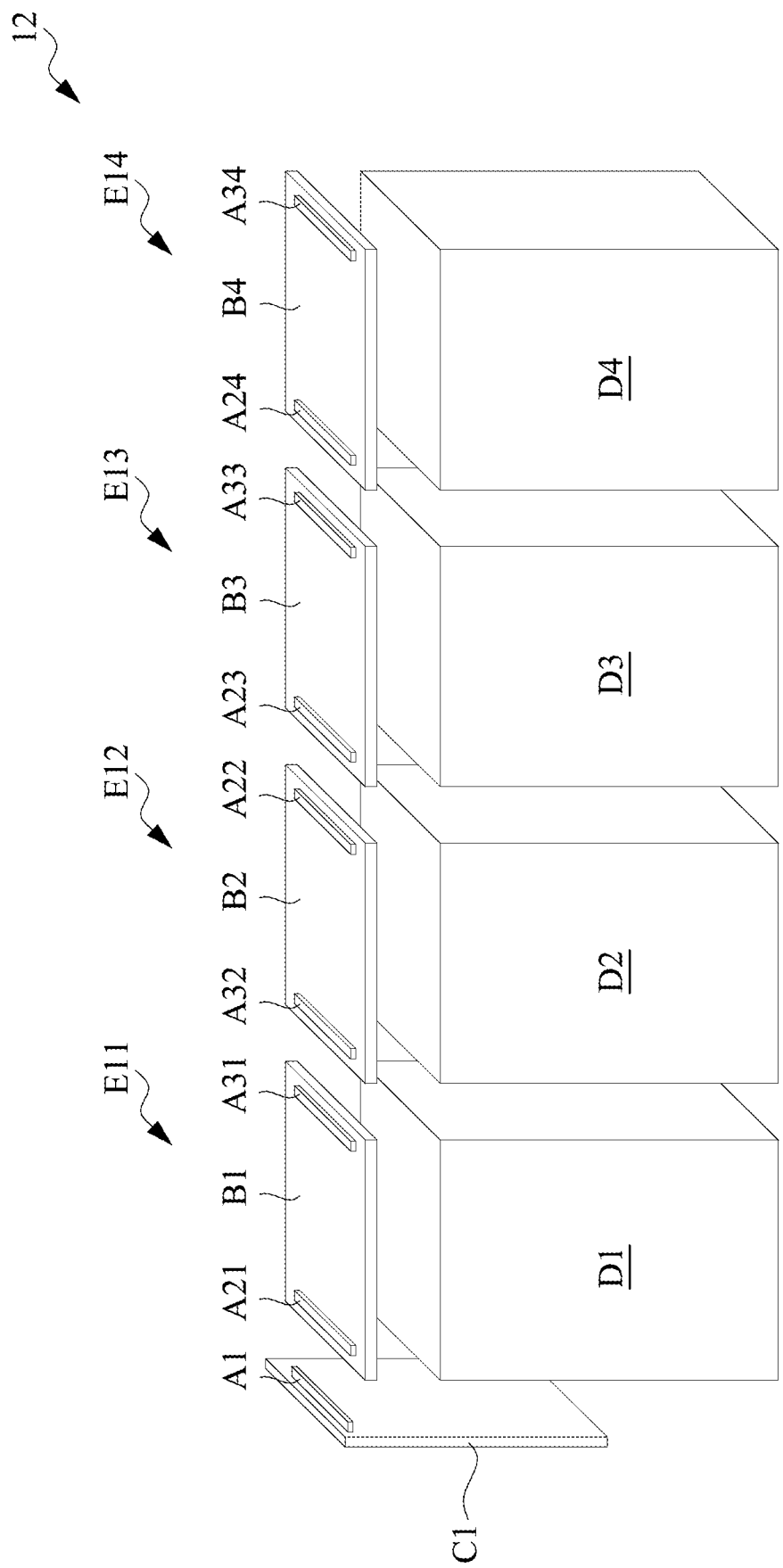
FIG. 10 is a schematic diagram illustrating a wireless management system according to the first embodiment of the present disclosure.

Related to the configuration of the controllers and the energy storage units, reference is made to FIG. 10. FIG. 10 is a schematic diagram illustrating a wireless management system 12 according to the first embodiment of the present disclosure.

As shown in FIG. 10, the controller C1 and the energy storage units E11, E12, E13, and E14 of the wireless management system 12 are arranged in a row, wherein an end of the controller C1 set with the wireless communication module A1 is close to an end of the node substrate B1 of the energy storage unit E11 set with the wireless communication module A21; an end of the node substrate B1 of the energy storage unit E11 set with the wireless communication module A31 is close to an end of the node substrate B2 of the energy storage unit E12 set with the wireless communication module A32; an end of the node substrate B2 of the energy storage unit E12 set with the wireless communication module A22 is close to an end of the node substrate B3 of the energy storage unit E13 set with the wireless communication module A23; an end of the node substrate B3 of the energy storage unit E13 set with the wireless communication module A33 is close to an end of the node substrate B4 of the energy storage unit E14 set with the wireless communication module A24.

Based on the above-mentioned operations, the wireless management system 12 can establish the local network N1, and the wireless communication module A1 of the controller C1 is communicatively connected to the wireless communication module A21 of the node substrate B1; the wireless communication module A31 of the node substrate B1 is communicatively connected to the wireless communication module A32 of the node substrate B2; the wireless communication module A22 of the node substrate B2 is communicatively connected to the wireless communication module A23 of the node substrate B3; the wireless communication module A33 of the node substrate B3 is communicatively connected to the wireless communication module A24 of the node substrate B4.

Additionally, since the wireless management system 12 is communicatively connected to the energy storage units E11-E14 in a daisy-chain form, when the controller C1 and the energy storage units E11-E14 transmit signals to each other, the controller C1 and the energy storage units E11-E14 need to transmit the signals through the adjacent (in the communicatively connecting relationships) controller and/or energy storage units. For example, when the energy storage unit E12 transmits signals to the controller C1, the energy storage unit E12 needs to transmit the signals to the energy storage unit E11, and the energy storage unit E11 transmit the signals to the controller C1.

Figure 11:
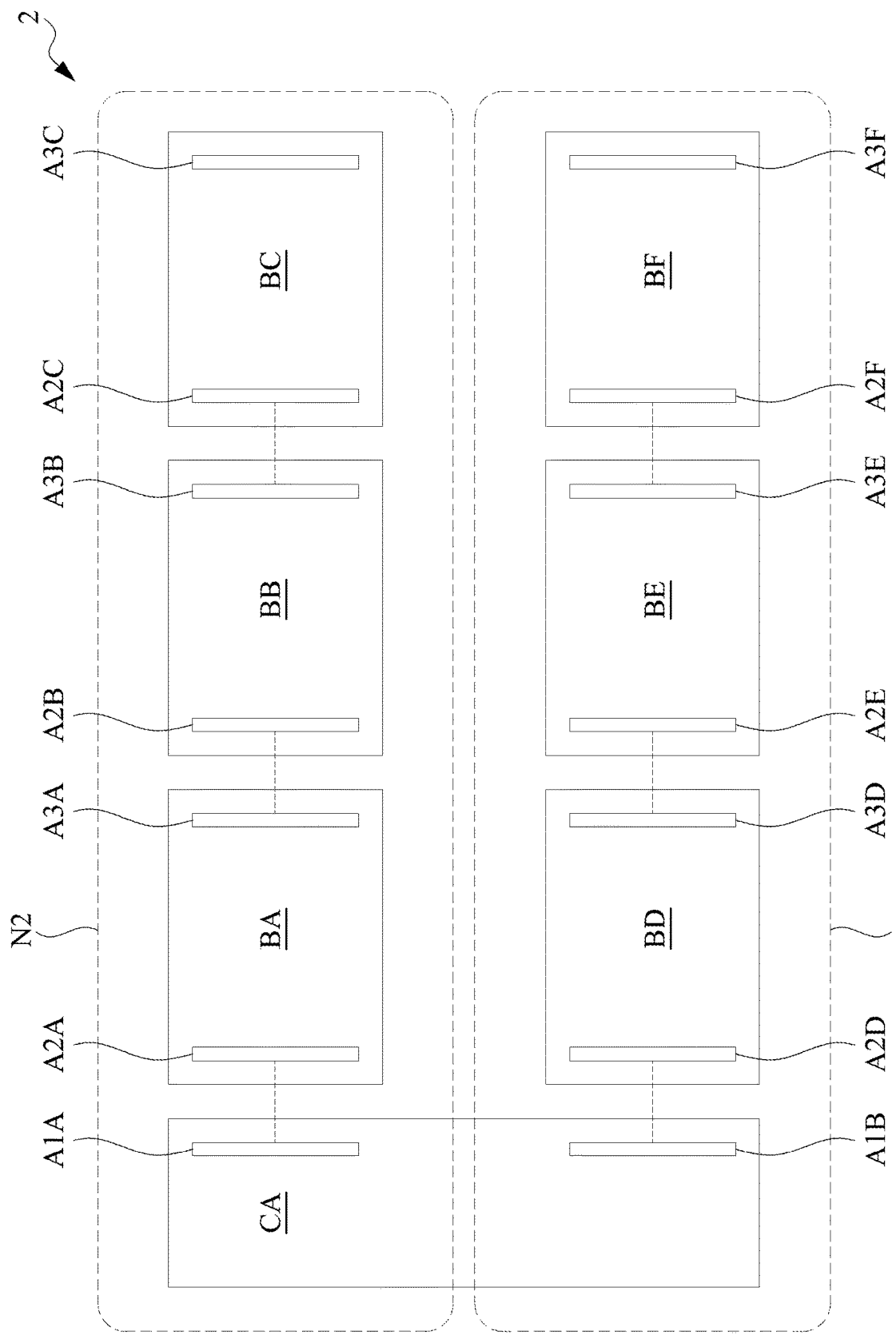
FIG. 11 is a schematic diagram illustrating an energy storage unit matrix establishing local networks according to the second embodiment of the present disclosure.

Reference is further made to FIG. 11. FIG. 11 is a schematic diagram illustrating an energy storage unit matrix 2 establishing local networks N2 and N3 according to the second embodiment of the present disclosure. The energy storage unit matrix 2 comprises a controller CA and node substrates BA, BB, BC, BD, BE, and BF, wherein one of the sides of the controller CA is set with wireless communication modules A1A and A1B. It is noticed that, the controller CA of the energy storage unit matrix 2 is similar with the controller C1 of the energy storage unit matrix 1 in the first embodiment, and the only difference is the controller CA comprising two first wireless communication modules and the controller C1 only comprising one first wireless communication module. Besides, the node substrates BA, BB, BC, BD, BE, and BF is the same as the node substrates in the first embodiment.

As shown in FIG. 11, the node substrates BA, BB, and BC are arranged in a row and close to each other (can be arranged in contact with each other or close to each other without contact), and the node substrate BA is close to the wireless communication module A1A of the controller CA. Identically, the node substrates BD, BE, and BF are arranged in a row and close to each other (can be arranged in contact with each other or close to each other without contact), and the node substrate BD is close to the wireless communication module A1B of the controller CA.

Ideally, the wireless communication module A1A of the controller CA and the node substrates BA, BB, and BC establish the local network N2 by the above-mentioned operations, wherein the wireless communication module A1A of the controller CA is communicatively connected to the wireless communication module A2A of the node substrate BA, the wireless communication module A3A of the node substrate BA is communicatively connected to the wireless communication module A2B of the node substrate BB, and the wireless communication module A3B of the node substrate BB is communicatively connected to the wireless communication module A2C of the node substrate BC. On the other hand, the wireless communication module A1B of the controller CA and the node substrates BD, BE, and BF establish the local network N3 by the above-mentioned operations, wherein the wireless communication module A1B of the controller CA is communicatively connected to the wireless communication module A2D of the node substrate BD, the wireless communication module A3D of the node substrate BD is communicatively connected to the wireless communication module A2E of the node substrate BE, and the wireless communication module A3E of the node substrate BE is communicatively connected to the wireless communication module A2F of the node substrate BF.

Figure 12:
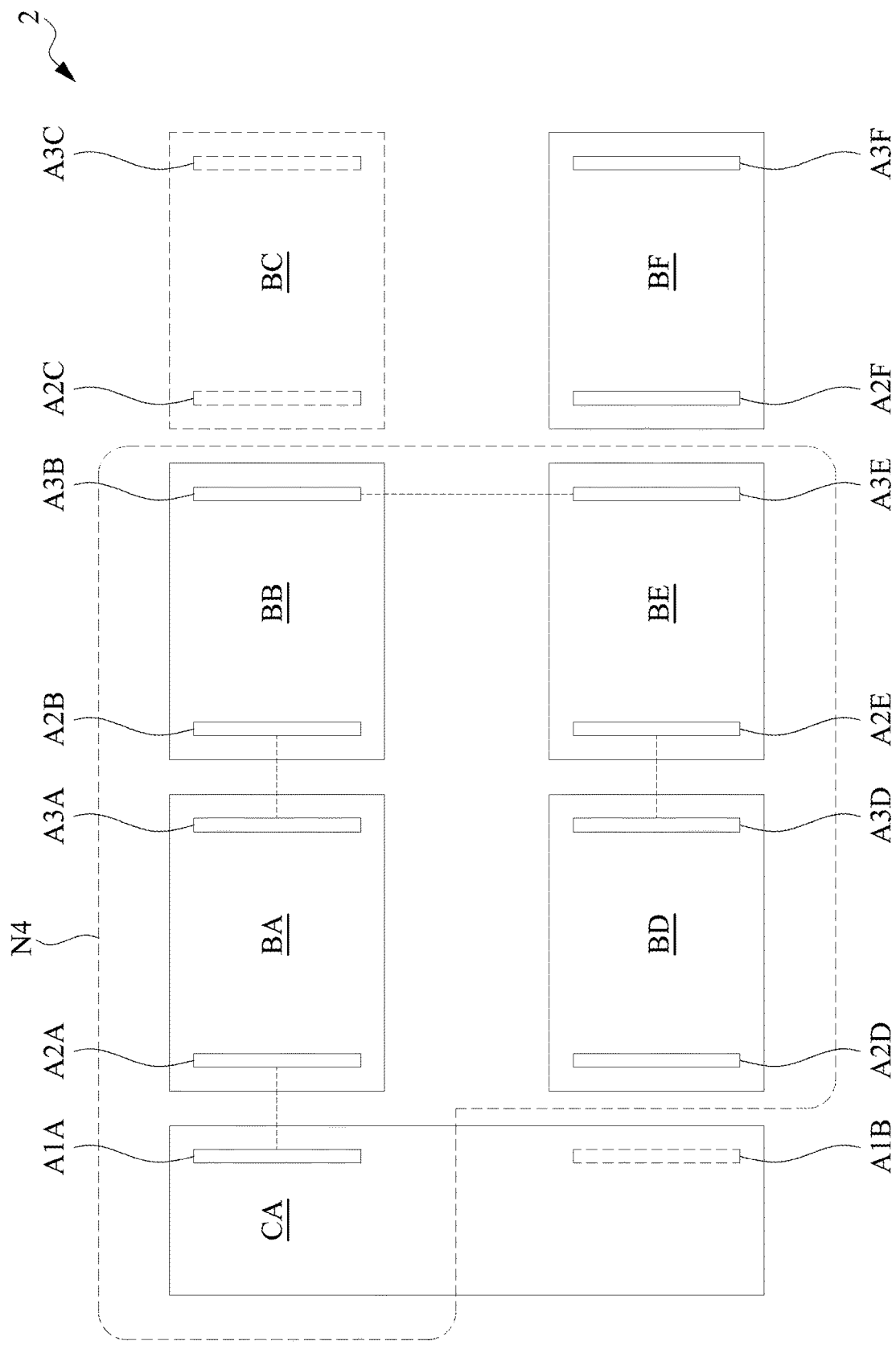
FIG. 12 is a schematic diagram illustrating the energy storage unit matrix establishing a local network according to the second embodiment of the present disclosure.

However, in some embodiments, when certain conditions are met, the present disclosure can establish a new local network based on specific reconnection mechanism. For ease of understanding, reference is made to FIG. 12. FIG. 12 is a schematic diagram illustrating the energy storage unit matrix 2 establishing a local network N4 according to the second embodiment of the present disclosure.

In some embodiments, after the energy storage unit matrix 2 establishes the local network N4, the first, second, and third wireless communication modules in the local network N4 will continue to listen for other request signals although the first, second, and third wireless communication modules are communicatively connected to other wireless communication module. When the signal strength of the request signal received by one of the first, second, and third wireless communication modules in the local network N4 is higher than the communication signal strength with the originally connected wireless communication module, the one of the first, second, and third wireless communication modules will disconnect the original communicative connection in the local network and connect to the node substrate corresponding to the wireless communication module with higher signal strength to join the local network.

For example, reference is made to FIG. 12, if the wireless communication module A1A starts to establish a local network, and the wireless communication module A1B and the node substrate BC are not able to work normally due to certain reason (e.g., malfunction, not installed, or disabled), as shown in FIG. 12, the energy storage unit matrix 2 establishes the local network N4 by the controller CA and the node substrates BA, BB, BE, and BD, wherein the wireless communication module A1A of the controller CA is communicatively connected to the wireless communication module A2A of the node substrate BA, the wireless communication module A3A of the node substrate BA is communicatively connected to the wireless communication module A2B of the node substrate BB, the wireless communication module A3B of the node substrate BB is communicatively connected to the wireless communication module A3E of the node substrate BE, and the wireless communication module A2E of the node substrate BE is communicatively connected to the wireless communication module A3D of the node substrate BD.

In the above-mentioned situation, when the wireless communication module A1B and the node substrate BC resume normal operation (e.g., the node substrate is fixed), the energy storage unit matrix 2 can re-establish the local network by the operations shown in FIG. 6A. Related to the details of the specific operations, reference is made to FIG. 13.

In this example, since the node substrate BC resumes normal operation, and the node substrate BC determines the existing local network (i.e., the local network N4) based on the signal transmitted by the node substrate BB (e.g., the invitation signal broadcasted by the node substrate BB). Specifically, the node substrate BC can transmits a request signal S6 through the wireless communication module A2C to the closest node substrate BB to join the local network N4. Same as the operations shown in FIG. 6A, the node substrate BB determines that the distance between the node substrates BB and BC is closer than the distance between the node substrates BB and BE (i.e., the communication signal strength of the wireless communication module A2C is higher than the communication signal strength of the wireless communication module A3E). Therefore, the node substrate BB selects the node substrate BC to join the local network N4 and disconnects the communicative connection between the node substrates BB and BE (i.e., disconnects the communicative connection to the wireless communication module A3E) to detach the node substrate BE from the local network N4.

Furthermore, since the node substrate BE is detached from the local network N4, the node substrate BE transmits a cancel signal to the node substrate BD to detach the node substrate BD from the local network N4.

On the other hand, since the wireless communication module A1B resumes normal operation, the wireless communication module A1B can establish a local network by the above-mentioned operations, and the node substrates BD, BE, and BF can join the local network (not shown in the figure) established by the wireless communication module A1B in order of distances.

Figure 13:
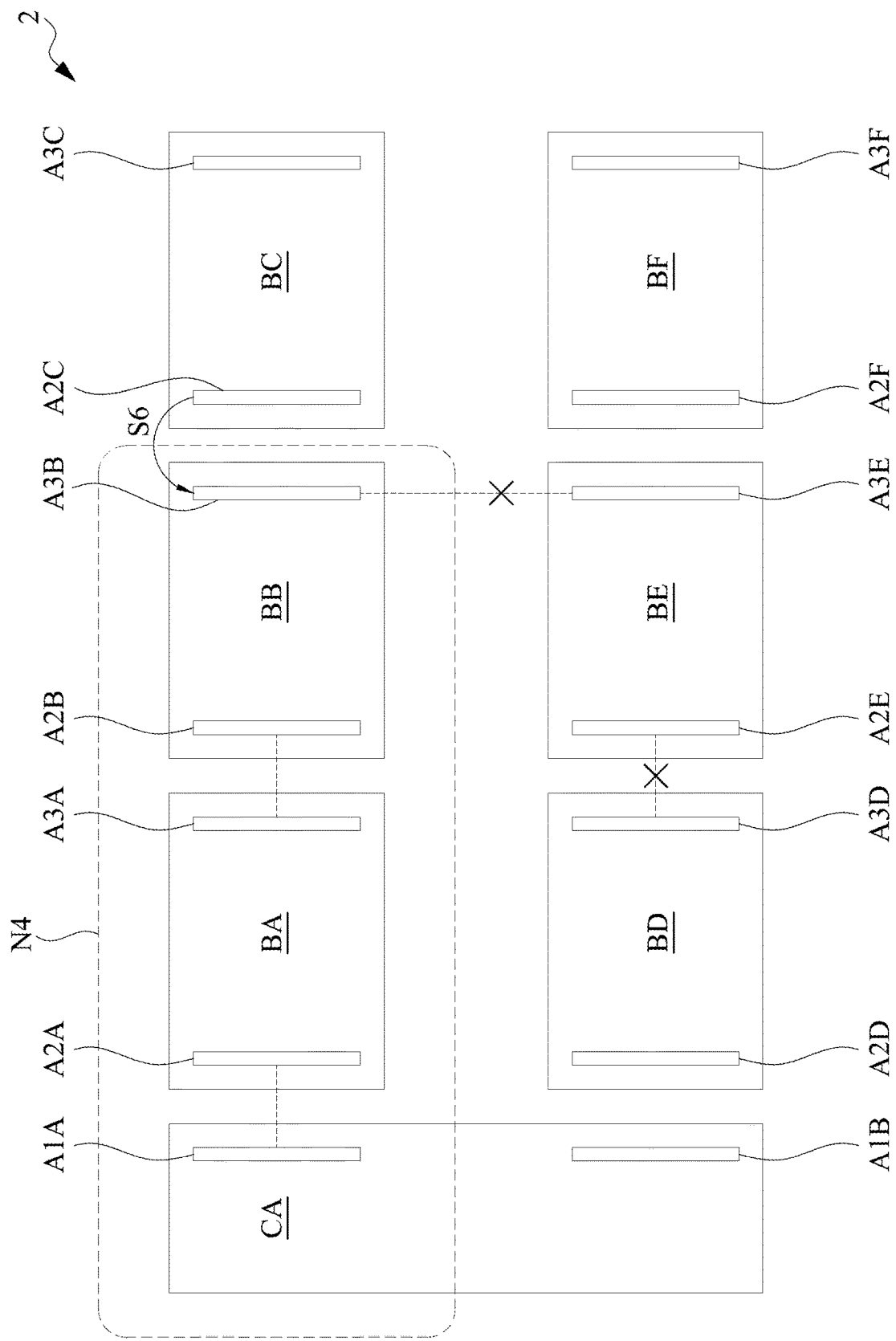
FIG. 13 is a schematic diagram illustrating an operation of an energy storage unit matrix re-establishing a local network according to the second embodiment of the present disclosure.

Finally, the energy storage unit matrix 2 can accomplish the wireless network connection status shown in FIG. 11, wherein the local network N4 shown in FIG. 13 comprising the wireless communication module A1A and the node substrates BA, BB, and BC corresponds to the local network N2 shown in FIG. 11, and the local network (not shown in the figure) established by the wireless communication module A1B comprising the wireless communication module A1B and the node substrates BD, BE, and BF corresponds to the local network N3 shown in FIG. 11.

Based on the above-mentioned embodiments, when the nodes in the local network are connected to each other in an unexpected way (e.g., the nodes are not connected to the closest node), the energy storage unit matrix 2 can adjusts the connections between each of the nodes in the local network by the above-mentioned reconnection mechanism to make each of the nodes in the local network communicatively connected to the node with the closest relative distance wirelessly and correctly.

Please return to FIG. 2, in some embodiments, the controller C1 further comprises a processor CP and a storage CM, wherein the processor CP is coupled to the wireless communication module A1 and the storage CM.

Furthermore, reference is made to FIG. 4, in some embodiments, the node substrate B1 further comprises a storage BM, a processor BP, and a sensor BS, wherein the processor BP is coupled to the wireless communication modules A21 and A31, the storage BM, and the sensor BS.

In some embodiments, the processor CP and/or the processor BP are configured to execute calculation and control other component in the controller C1 and/or the node substrate B1, e.g., determining signal strengths, assigning serial numbers, and transmitting signals. The processor CP and/or the processor BP can comprise a central processing unit (CPU), a multi-processor, a distributed processing system, an application specific integrated circuit (ASIC), and/or a suitable processing unit.

In some embodiments, the storage CM and/or the storage BM can comprise a semiconductor or solid-state memory, a magnetic tape, a removable computer diskette, a random-access memory (RAM), a read-only memory (ROM), a rigid magnetic disk, and/or an optical disk.

During establishing or joining a local network, the storage CM of the controller C1 and the storage BM of the node substrate B1 are configured to store the data related to the local network.

In some embodiments, the storage CM and/or the storage BM store a source of the local network, e.g., the identification data of the wireless communication module A1 of the controller C1 in the local network N1 shown in FIG. 9.

In some embodiments, the storage CM and/or the storage BM also store roles of the corresponding the controller C1 and/or the node substrate B1 in the local network. For example, in the local network N1 shown in FIG. 9, the controller C1 does not follow a corresponding coordinator in the local network N1, the controller C1 is a root of the local network N1 and also the 0th member, and the role of the controller C1 in the local network N1 is represented by root (0); the node substrate B1 follows a corresponding coordinator in the local network N1 and has a corresponding subscriber, the node substrate B1 is a stem of the local network N1 and also the 1st member, and the role of the node substrate B1 in the local network N1 is represented by stem (1); the node substrate B2 follows a corresponding coordinator in the local network N1 and does not have a corresponding subscriber, the node substrate B2 is a leaf of the local network N1 and also the 2nd member, and the role of the node substrate B2 in the local network N1 is represented by leaf (2).

In some embodiments, the storage CM and/or the storage BM also store a current length of the local network. For example, if a local network comprises 1 controller and 13 node substrates (the controller is the 0th member, and the node substrates comprise the 1st to 13th members), the current length of the local network is 13.

In some embodiments, the storage CM and/or the storage BM also store a maximum length of the local network, and the maximum length can be set according to needs. Taking the local network N1 shown in FIG. 9 as an example, when the maximum length is 2, and the node substrates B1 and B2 join the local network N1, the local network N1 will stop adding other members. For example, the controller C1 can transmit a stop signal to the last member in the local network (i.e., the node substrate B2), making the node substrate B2 stop broadcasting invitation signals and/or receiving request signals to stop new members joining the local network N1. Therefore, a wrong configuration of the local network can be avoided.

In some embodiments, the storage CM and/or the storage BM also store serial numbers of the corresponding the controller C1 and/or the node substrate B1 in the local network. For example, the controller C1 corresponding to the storage CM is the 0th member of the local network N1, so the serial number is 0; the node substrate B1 corresponding to the storage BM is the 1st member of the local network N1, so the serial number is 1.

In some embodiments, the storage CM and/or the storage BM also store data of a wireless communication module as a subscriber and a corresponding coordinator wireless communication module corresponding to the controller C1 and/or the node substrate B1. Taking the local network N1 shown in FIG. 9 as an example, the storage BM of the node substrate B1 can store the identification data of the wireless communication module A21 as the subscriber and the identification data of the corresponding coordinator wireless communication module A1.

In some embodiments, the storage CM and/or the storage BM also store data of a wireless communication module as a coordinator and a corresponding subscriber wireless communication module corresponding to the controller C1 and/or the node substrate B1. Taking the local network N1 shown in FIG. 9 as an example, the storage BM of the node substrate B1 can store the identification data of the wireless communication module A31 as the coordinator and the identification data of the corresponding subscriber wireless communication module A1.

In some embodiments, the storage CM and/or the storage BM also store a survival time from joining the local network to the current time corresponding to the controller C1 and/or the node substrate B1.

In some embodiments, the storage CM and/or the storage BM also store communication signal strengths between the corresponding controller C1 and/or node substrate B1 and other devices communicatively connected with. Taking the local network N1 shown in FIG. 9 as an example, the storage BM of the node substrate B1 can store the communication signal strength between the wireless communication module A21 and the wireless communication module A1 of the controller C1 and/or the communication signal strength between the wireless communication module A31 and the wireless communication module A32 of the node substrate B2. Therefore, the controller C1 and/or the node substrate B1 can determine whether a wireless communication module exists with higher communication signal strength in the environment.

In some embodiments, node substrates in the local network are further configured to transmit configuration signals to the controller. Taking the local network N1 shown in FIG. 9 as an example, the node substrate B1 and/or B2 transmit the configuration signals to the controller C1, wherein the configuration signals can comprise survival times after joining the local network N1 and the communication signal strengths with other members communicatively connected with in the local network N1. For example, the configuration signal transmitted by the node substrate B1 can comprise the communication signal strength between the node substrates B1 and B2. In some embodiments, the node substrate B1 or B2 can transmit the configuration signal to the controller C1 at regular intervals (e.g., per 1 second).

Furthermore, the controller C1 can also determine whether the local network N1 is established completely based on the configuration signals transmitted by the node substrates B1 and B2 in the local network N1. For example, the controller C1 can determine whether the survival time is higher than a time threshold (e.g., 10 seconds). If the survival times of all of the members in the local network N1 are higher than the time threshold, the controller C1 determines that the local network N1 is established completely.

On the other hand, the controller C1 can further determine whether the communication signal strengths of the communicative connections in the local network N1 are higher than a strength threshold (e.g., −70 db). If the communication signal strengths of all of the communicative connections in the local network N1 are higher than the strength threshold and the survival times of all of the members in the local network N1 are higher than the time threshold, the controller C1 determines that the local network N1 is established completely. Furthermore, the controller C1 can transmit a stop signal to the last member in the local network (i.e., the node substrate B2), making the node substrate B2 stop broadcasting invitation signals and/or receiving request signals to stop new members joining the local network N1.

In some embodiments, the sensor BS is configured to measure statuses of the energy storage device to obtain the measured value. For example, the sensor BS can comprise a voltmeter, an ammeter, an ohmmeter and/or a thermometer configured to measure the voltage, current, resistance and/or temperature of the energy storage device relatively.

In some embodiments, node substrates in the local networks are further configured to transmit the measured value obtained by the sensor BS to the controller. Taking the local network N1 shown in FIG. 9 as an example, after the sensor BS of the node substrate B1 or B2 obtains the measured value such as the voltage, current, resistance and/or temperature, the node substrate B1 or B2 can transmit a measurement signal to the controller C1, wherein the measurement signal can comprise the measured value and the serial number assigned (e.g., 1 or 2) of the energy storage unit (i.e., the energy storage unit E11 or E12) corresponding to the node substrate B1 or B2. Therefore, the controller C1 can evaluate the operation statuses of the energy storage devices in the wireless management system 12 based on the measurement signal.

In some embodiments, the node substrate B1 or B2 can transmit the measurement signal to the controller C1 at regular intervals (e.g., per 1 second). In some embodiments, the controller C1 can also transmit a control signal to the node substrate B1 or B2 in the local network N1. After the node substrate B1 or B2 receives the control signal, the node substrate B1 or B2 obtains the measured value through the sensor BS and transmits the measurement signal to the controller C1. After the controller C1 receives the measurement signal, the controller C1 can determine the source of the measurement signal based on the serial number in the measurement signal and obtains the operation status of the corresponding energy storage device.

Figure 14:
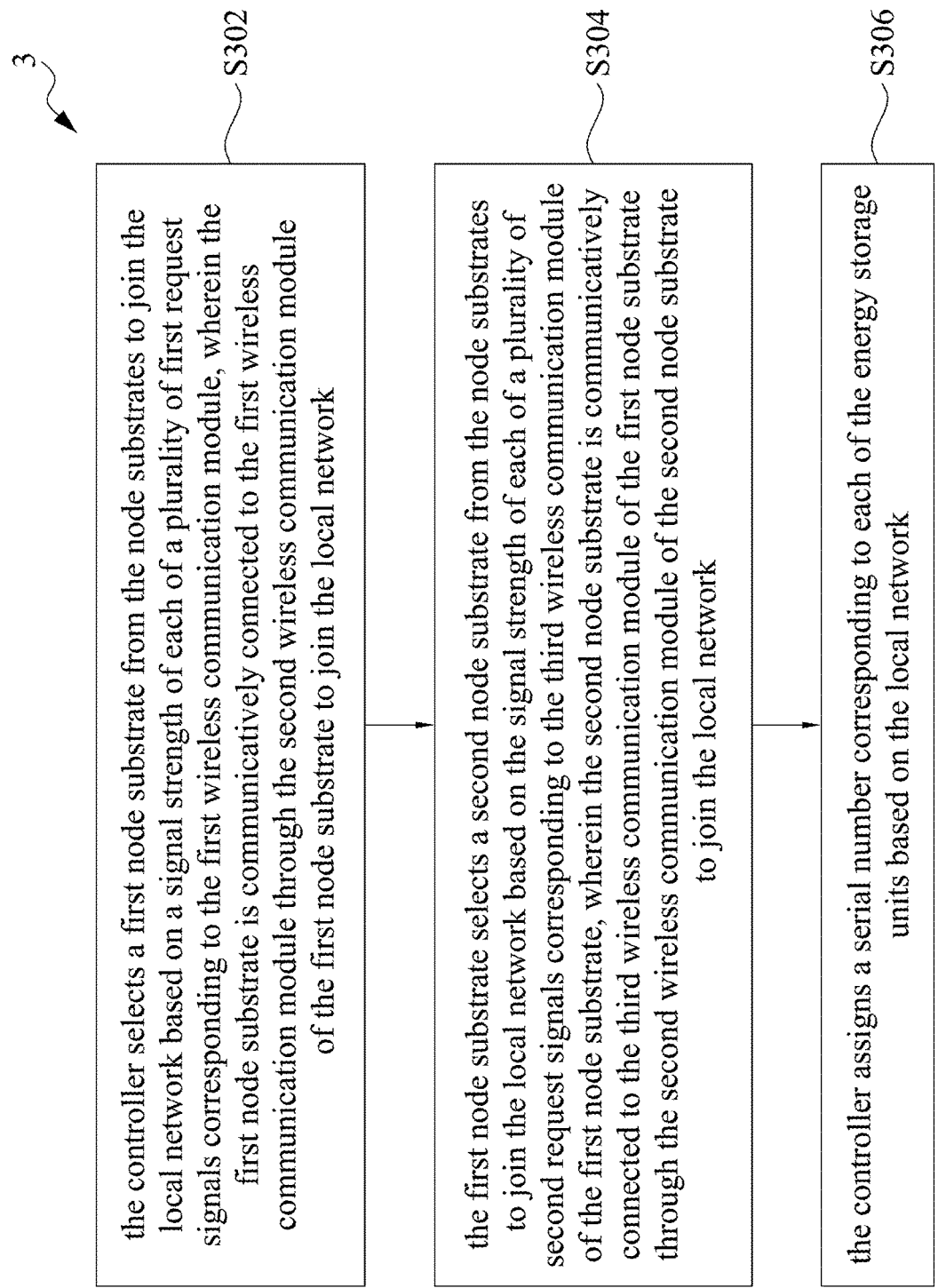
FIG. 14 is a flow diagram illustrating a wireless management method according to the third embodiment of the present disclosure.

Reference is made to FIG. 14. FIG. 14 is a flow diagram illustrating a wireless management method 3 according to the third embodiment of the present disclosure. The wireless management method 3 comprises steps S302, S304, and S306. The wireless management method 3 is adapted for use in a wireless management system (e.g., the wireless management system 12). The wireless management system comprises a controller (e.g., the controller C1) and a plurality of energy storage units (e.g., the energy storage units E11, E12, E13, and E14). The controller comprises a first wireless communication module (e.g., the wireless communication module A1), and the controller is configured to establish a local network (e.g., the local network N1) through the first wireless communication module. Each of the energy storage units comprises an energy storage device (e.g., the energy storage device D1) and a node substrate (e.g., the node substrate B1). The node substrate is electrically connected to the energy storage device, wherein a second wireless communication module (e.g., the wireless communication module A21) and a third wireless communication module (e.g., the wireless communication module A31) are set on opposite sides of the node substrate respectively.

In the step S302, the controller selects a first node substrate from the node substrates to join the local network based on a signal strength of each of a plurality of first request signals corresponding to the first wireless communication module, wherein the first node substrate is communicatively connected to the first wireless communication module through the second wireless communication module of the first node substrate to join the local network.

Next, in the step S304, the first node substrate selects a second node substrate from the node substrates to join the local network based on the signal strength of each of a plurality of second request signals corresponding to the third wireless communication module of the first node substrate, wherein the second node substrate is communicatively connected to the third wireless communication module of the first node substrate through the second wireless communication module of the second node substrate to join the local network.

Finally, in the step S306, the controller assigns a serial number corresponding to each of the energy storage units based on the local network.

In some embodiments, a communication signal strength between the second wireless communication module of the first node substrate and the first wireless communication module is higher than the communication signal strength between the third wireless communication module of the first node substrate and the first wireless communication module.

In some embodiments, the step of the first node substrate selecting the second node substrate from the node substrates to join the local network of the wireless management method 3 further comprises the first node substrate receives the second request signals from the node substrates; the first node substrate calculates the signal strength of each of the second request signals corresponding to the third wireless communication module of the first node substrate; selecting a third request signal from the second request signals, wherein the third request signal has a strongest signal strength within the second request signals; and selecting the second node substrate corresponding to the third request signal to join the local network.

In some embodiments, the wireless management method 3 further comprises the first wireless communication module of the controller broadcasts an invitation signal; and in response to receiving the invitation signal, the second wireless communication modules or the third wireless communication modules of the node substrates receiving the invitation signal transmits the first request signals to the first wireless communication module.

In some embodiments, the wireless management method 3 further comprises a third node substrate of the node substrates receives a plurality of invitation signals; the third node substrate calculates the signal strength of each of the invitation signals corresponding to the second wireless communication module of the first node substrate; selecting a first invitation signal from the invitation signals, wherein the first invitation signal has a strongest signal strength within the invitation signals; and transmitting a fourth invitation signal to a fourth node substrate corresponding to the first invitation signal, wherein the fourth node substrate is one of the node substrates.

In some embodiments, the step of assigning the serial number corresponding to each of the energy storage units based on the local network by the controller of the wireless management method 3 further comprises the controller assigns the serial number corresponding to each of the energy storage units based on a connection status record corresponding to the local network, wherein the connection status record corresponds to a joining order of the energy storage units joining the local network.

In some embodiments, the first node substrate joined the local network is further configured to execute the following steps: receiving a fifth request signal from the second wireless communication module of a fifth node substrate of the node substrates; determining the signal strength of the fifth request signal corresponding to the third wireless communication module of the first node substrate; in response to the signal strength of the fifth request signal corresponding to the third wireless communication module of the first node substrate higher than a communication signal strength between the third wireless communication module of the first node substrate and the second wireless communication module of the second node substrate, selecting the fifth node substrate to join the local network, wherein the fifth node substrate is communicatively connected to the third wireless communication module of the first node substrate through the second wireless communication module of the fifth node substrate to join the local network; and disconnecting a communicative connection between the third wireless communication module of the first node substrate and the second wireless communication module of the second node substrate to detach the second node substrate from the local network.

In some embodiments, the second node substrate joined the local network is further configured to execute the following steps: receiving a second invitation signal from the second wireless communication module of a sixth node substrate of the node substrates; determining the signal strength of the second invitation signal corresponding to the second wireless communication module of the second node substrate; in response to the signal strength of the second invitation signal corresponding to the second wireless communication module of the second node substrate higher than a communication signal strength between the third wireless communication module of the first node substrate and the second wireless communication module of the second node substrate, joining a second local network corresponding to the sixth node substrate; and disconnecting a communicative connection between the third wireless communication module of the first node substrate and the second wireless communication module of the second node substrate to detach the second node substrate from the local network.

In some embodiments, the wireless management method 3 further comprises the second node substrate selects a seventh node substrate from the node substrates to join the local network based on the signal strength of each of a plurality of sixth request signals corresponding to the third wireless communication module of the second node substrate, wherein the seventh node substrate is communicatively connected to the third wireless communication module of the second node substrate through the second wireless communication module of the seventh node substrate to join the local network.

In some embodiments, the wireless management method 3 further comprises in response to the second node substrate detached from the local network, the seventh node substrate disconnects a communicative connection between the third wireless communication module of the second node substrate and the second wireless communication module of the seventh node substrate to detach the seventh node substrate from the local network.

In some embodiments, the wireless management method 3 further comprises in response to a number of the node substrates joined the local network equal to a maximum length, the controller transmits a stop signal to a leaf node substrate at an end of the local network; and in response to receiving the stop signal, the leaf node substrate stop broadcasting an invitation signal or stop receiving a request signal.

In some embodiments, the wireless management method 3 further comprises the first node substrate transmits a configuration signal to the controller, wherein the configuration signal comprises a survival time after the first node substrate joining the local network. In some embodiments, the first node substrate can transmit the configuration signal to the controller C1 at regular intervals (e.g., per 1 second). In some embodiments, the wireless management method 3 further comprises determining whether the local network is established completely based on the configuration signal and a time threshold.

In some embodiments, the configuration signal further comprises the communication signal strength between the first node substrate and the second node substrate. In some embodiments, the wireless management method 3 further comprises the controller determines whether the local network is established completely based on the configuration signal, a strength threshold, and the time threshold.

In some embodiments, the node substrate of each of the energy storage units further comprises a sensor configured to measure a status of the energy storage device. In some embodiments, the sensor comprises a voltmeter, an ammeter, an ohmmeter and/or a thermometer. In some embodiments, the wireless management method 3 further comprises the first node substrate transmits a measurement signal to the controller, wherein the measurement signal comprises a voltage, current, resistance and/or temperature corresponding to the energy storage device obtained by the sensor.

In some embodiments, the wireless management method 3 further comprises the node substrate of each of the energy storage units transmits the measurement signal to the controller at regular intervals (e.g., per 1 second). In some embodiments, the wireless management method 3 further comprises the controller transmits a control signal to the node substrate of each of the energy storage units; and in response to receiving the control signal, the node substrate of each of the energy storage units transmits the measurement signal to the controller.

Based on the embodiments mentioned above, the wireless management method 3 can establish the local network in a daisy chain form, wherein each of the first, second, and third wireless communication module is communicatively connected to the wireless communication module with the closest relative distance and transmits signals to other controller and/or node substrate through the closest wireless communication module achieving the daisy chain network establishment correctly in a wireless form. Additionally, the second node substrate can also invite other node substrate to join the local network by the same steps.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wireless management system, comprising:
a controller, comprising a first wireless communication module, and the controller is configured to establish a local network through the first wireless communication module; and
a plurality of energy storage units, wherein each of the energy storage units comprises:
an energy storage device; and
a node substrate, electrically connected to the energy storage device, wherein a second wireless communication module and a third wireless communication module are set on opposite sides of the node substrate respectively;
wherein the wireless management system is configured to execute the following operations:
selecting, by the controller, a first node substrate from the node substrates to join the local network based on a signal strength of each of a plurality of first request signals corresponding to the first wireless communication module, wherein the first node substrate is communicatively connected to the first wireless communication module through the second wireless communication module of the first node substrate to join the local network;
selecting, by the first node substrate, a second node substrate from the node substrates to join the local network based on the signal strength of each of a plurality of second request signals corresponding to the third wireless communication module of the first node substrate, wherein the second node substrate is communicatively connected to the third wireless communication module of the first node substrate through the second wireless communication module of the second node substrate to join the local network; and
assigning, by the controller, a serial number corresponding to each of the energy storage units based on the local network.

2. The wireless management system of claim 1, wherein a communication signal strength between the second wireless communication module of the first node substrate and the first wireless communication module is higher than the communication signal strength between the third wireless communication module of the first node substrate and the first wireless communication module.

3. The wireless management system of claim 1, wherein the operation of the first node substrate selecting the second node substrate from the node substrates to join the local network further comprising:
receiving, by the first node substrate, the second request signals from the node substrates;
calculating, by the first node substrate, the signal strength of each of the second request signals corresponding to the third wireless communication module of the first node substrate;
selecting a third request signal from the second request signals, wherein the third request signal has a strongest signal strength within the second request signals; and
selecting the second node substrate corresponding to the third request signal to join the local network.

4. The wireless management system of claim 1, wherein the wireless management system is further configured to execute the following operations:
broadcasting, by the first wireless communication module of the controller, an invitation signal; and
in response to receiving the invitation signal, transmitting, by the second wireless communication modules or the third wireless communication modules of the node substrates receiving the invitation signal, the first request signals to the first wireless communication module.

5. The wireless management system of claim 1, wherein the wireless management system is further configured to execute the following operations:
receiving, by a third node substrate of the node substrates, a plurality of invitation signals;
calculating, by the third node substrate, the signal strength of each of the invitation signals corresponding to the second wireless communication module of the first node substrate;
selecting a first invitation signal from the invitation signals, wherein the first invitation signal has a strongest signal strength within the invitation signals; and
transmitting a fourth request signal to a fourth node substrate corresponding to the first invitation signal, wherein the fourth node substrate is one of the node substrates.

6. The wireless management system of claim 1, wherein the operation of assigning the serial number corresponding to each of the energy storage units based on the local network by the controller further comprising:
assigning, by the controller, the serial number corresponding to each of the energy storage units based on a connection status record corresponding to the local network, wherein the connection status record corresponds to a joining order of the energy storage units joining the local network.

7. The wireless management system of claim 1, wherein the first node substrate joined the local network is further configured to execute the following operations:

receiving a fifth request signal from the second wireless communication module of a fifth node substrate of the node substrates;

determining the signal strength of the fifth request signal corresponding to the third wireless communication module of the first node substrate;

in response to the signal strength of the fifth request signal corresponding to the third wireless communication module of the first node substrate higher than a communication signal strength between the third wireless communication module of the first node substrate and the second wireless communication module of the second node substrate, selecting the fifth node substrate to join the local network, wherein the fifth node substrate is communicatively connected to the third wireless communication module of the first node substrate through the second wireless communication module of the fifth node substrate to join the local network; and disconnecting a communicative connection between the third wireless communication module of the first node substrate and the second wireless communication module of the second node substrate to detach the second node substrate from the local network.

8. The wireless management system of claim 1, wherein the second node substrate joined the local network is further configured to execute the following operations:

receiving a second invitation signal from the second wireless communication module of a sixth node substrate of the node substrates;

determining the signal strength of the second invitation signal corresponding to the second wireless communication module of the second node substrate;

in response to the signal strength of the second invitation signal corresponding to the second wireless communication module of the second node substrate higher than a communication signal strength between the third wireless communication module of the first node substrate and the second wireless communication module of the second node substrate, joining a second local network corresponding to the sixth node substrate; and disconnecting a communicative connection between the third wireless communication module of the first node substrate and the second wireless communication module of the second node substrate to detach the second node substrate from the local network.

9. The wireless management system of claim 1, wherein the wireless management system is further configured to execute the following operations:

selecting, by the second node substrate, a seventh node substrate from the node substrates to join the local network based on the signal strength of each of a plurality of sixth request signals corresponding to the third wireless communication module of the second node substrate, wherein the seventh node substrate is communicatively connected to the third wireless communication module of the second node substrate through the second wireless communication module of the seventh node substrate to join the local network.

10. The wireless management system of claim 9, wherein the wireless management system is further configured to execute the following operations:

in response to the second node substrate detached from the local network, disconnecting, by the seventh node substrate, a communicative connection between the third wireless communication module of the second node substrate and the second wireless communication module of the seventh node substrate to detach the seventh node substrate from the local network.

11. A wireless management method, being adapted for use in a wireless management system, wherein the wireless management system comprises a controller and a plurality of energy storage units, the controller comprises a first wireless communication module and is configured to establish a local network, each of the energy storage units comprises an energy storage device and a node substrate, a second wireless communication module and a third wireless communication module are set on opposite sides of the node substrate respectively, and the wireless management method comprises the following steps:

selecting, by the controller, a first node substrate from the node substrates to join the local network based on a signal strength of each of a plurality of first request signals corresponding to the first wireless communication module, wherein the first node substrate is communicatively connected to the first wireless communication module through the second wireless communication module of the first node substrate to join the local network;

selecting, by the first node substrate, a second node substrate from the node substrates to join the local network based on the signal strength of each of a plurality of second request signals corresponding to the third wireless communication module of the first node substrate, wherein the second node substrate is communicatively connected to the third wireless communication module of the first node substrate through the second wireless communication module of the second node substrate to join the local network; and assigning, by the controller, a serial number corresponding to each of the energy storage units based on the local network.

12. The wireless management method of claim 11, wherein a communication signal strength between the second wireless communication module of the first node substrate and the first wireless communication module is higher than the communication signal strength between the third wireless communication module of the first node substrate and the first wireless communication module.

13. The wireless management method of claim 11, wherein the step of the first node substrate selecting the second node substrate from the node substrates to join the local network further comprising:

receiving, by the first node substrate, the second request signals from the node substrates;

calculating, by the first node substrate, the signal strength of each of the second request signals corresponding to the third wireless communication module of the first node substrate;

selecting a third request signal from the second request signals, wherein the third request signal has a strongest signal strength within the second request signals; and selecting the second node substrate corresponding to the third request signal to join the local network.

14. The wireless management method of claim 11, wherein the wireless management method further comprising:

broadcasting, by the first wireless communication module of the controller, an invitation signal; and in response to receiving the invitation signal, transmitting, by the second wireless communication modules or the third wireless communication modules of the node substrates, the first request signals to the first wireless communication module.

15. The wireless management method of claim 11, wherein the wireless management method further comprising:
- receiving, by a third node substrate of the node substrates, a plurality of invitation signals;
- calculating, by the third node substrate, the signal strength of each of the invitation signals corresponding to the second wireless communication module of the first node substrate;
- selecting a first invitation signal from the invitation signals, wherein the first invitation signal has a strongest signal strength within the invitation signals; and
- transmitting a fourth invitation signal to a fourth node substrate corresponding to the first invitation signal, wherein the fourth node substrate is one of the node substrates.

16. The wireless management method of claim 11, wherein the step of assigning the serial number corresponding to each of the energy storage units based on the local network by the controller further comprising:
- assigning, by the controller, the serial number corresponding to each of the energy storage units based on a connection status record corresponding to the local network, wherein the connection status record corresponds to a joining order of the energy storage units joining the local network.

17. The wireless management method of claim 11, wherein the first node substrate joined the local network is further configured to execute the following steps:
- receiving a fifth request signal from the second wireless communication module of a fifth node substrate of the node substrates;
- determining the signal strength of the fifth request signal corresponding to the third wireless communication module of the first node substrate;
- in response to the signal strength of the fifth request signal corresponding to the third wireless communication module of the first node substrate higher than a communication signal strength between the third wireless communication module of the first node substrate and the second wireless communication module of the second node substrate, selecting the fifth node substrate to join the local network, wherein the fifth node substrate is communicatively connected to the third wireless communication module of the first node substrate through the second wireless communication module of the fifth node substrate to join the local network; and
- disconnecting a communicative connection between the third wireless communication module of the first node substrate and the second wireless communication module of the second node substrate to detach the second node substrate from the local network.

18. The wireless management method of claim 11, wherein the second node substrate joined the local network is further configured to execute the following steps:
- receiving a second invitation signal from the second wireless communication module of a sixth node substrate of the node substrates;
- determining the signal strength of the second invitation signal corresponding to the second wireless communication module of the second node substrate;
- in response to the signal strength of the second invitation signal corresponding to the second wireless communication module of the second node substrate higher than a communication signal strength between the third wireless communication module of the first node substrate and the second wireless communication module of the second node substrate, joining a second local network corresponding to the sixth node substrate; and
- disconnecting a communicative connection between the third wireless communication module of the first node substrate and the second wireless communication module of the second node substrate to detach the second node substrate from the local network.

19. The wireless management method of claim 11, wherein the wireless management method further comprising:
- selecting, by the second node substrate, a seventh node substrate from the node substrates to join the local network based on the signal strength of each of a plurality of sixth request signals corresponding to the third wireless communication module of the second node substrate, wherein the seventh node substrate is communicatively connected to the third wireless communication module of the second node substrate through the second wireless communication module of the seventh node substrate to join the local network.

20. The wireless management method of claim 19, wherein the wireless management method further comprising:
- in response to the second node substrate detached from the local network, disconnecting, by the seventh node substrate, a communicative connection between the third wireless communication module of the second node substrate and the second wireless communication module of the seventh node substrate to detach the seventh node substrate from the local network.

* * * * *